May 20, 1947.  A. P. DAVIS  2,420,816
POSITION CONTROL SYSTEM
Original Filed Dec. 10, 1932  2 Sheets—Sheet 2
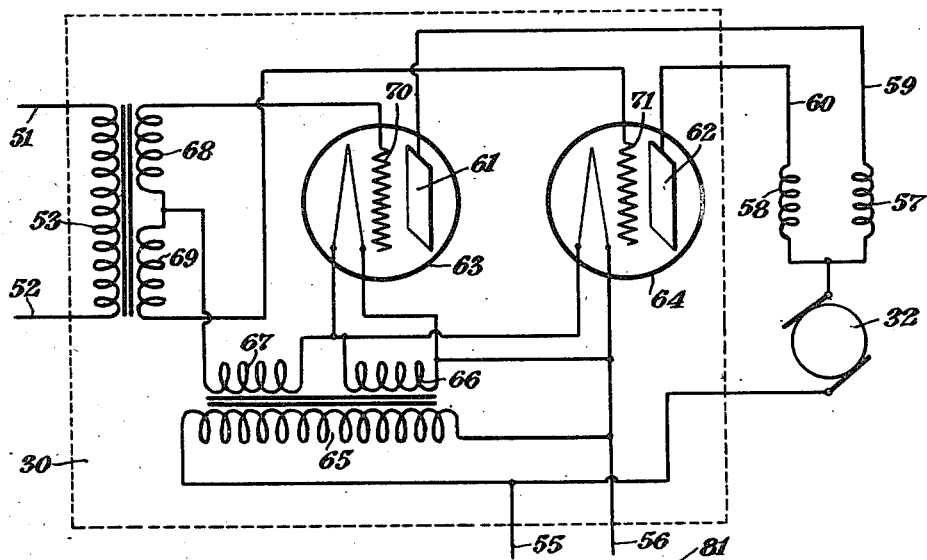
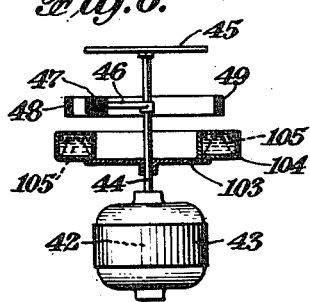
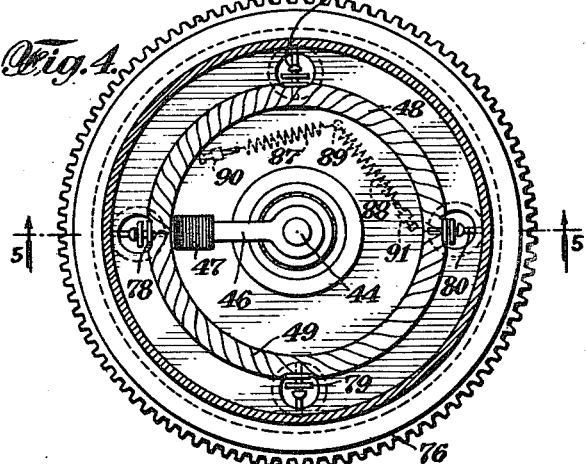
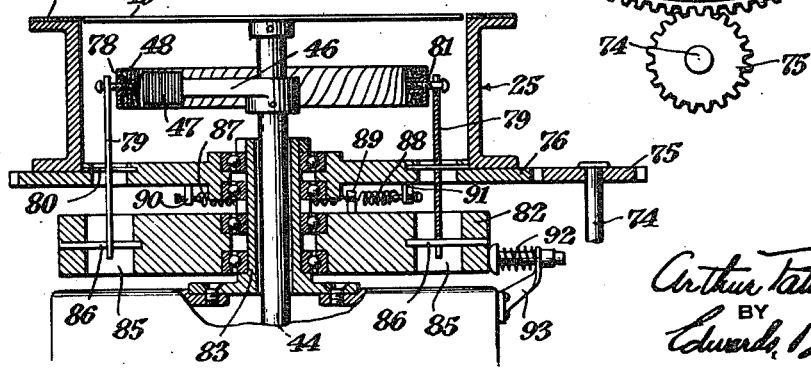

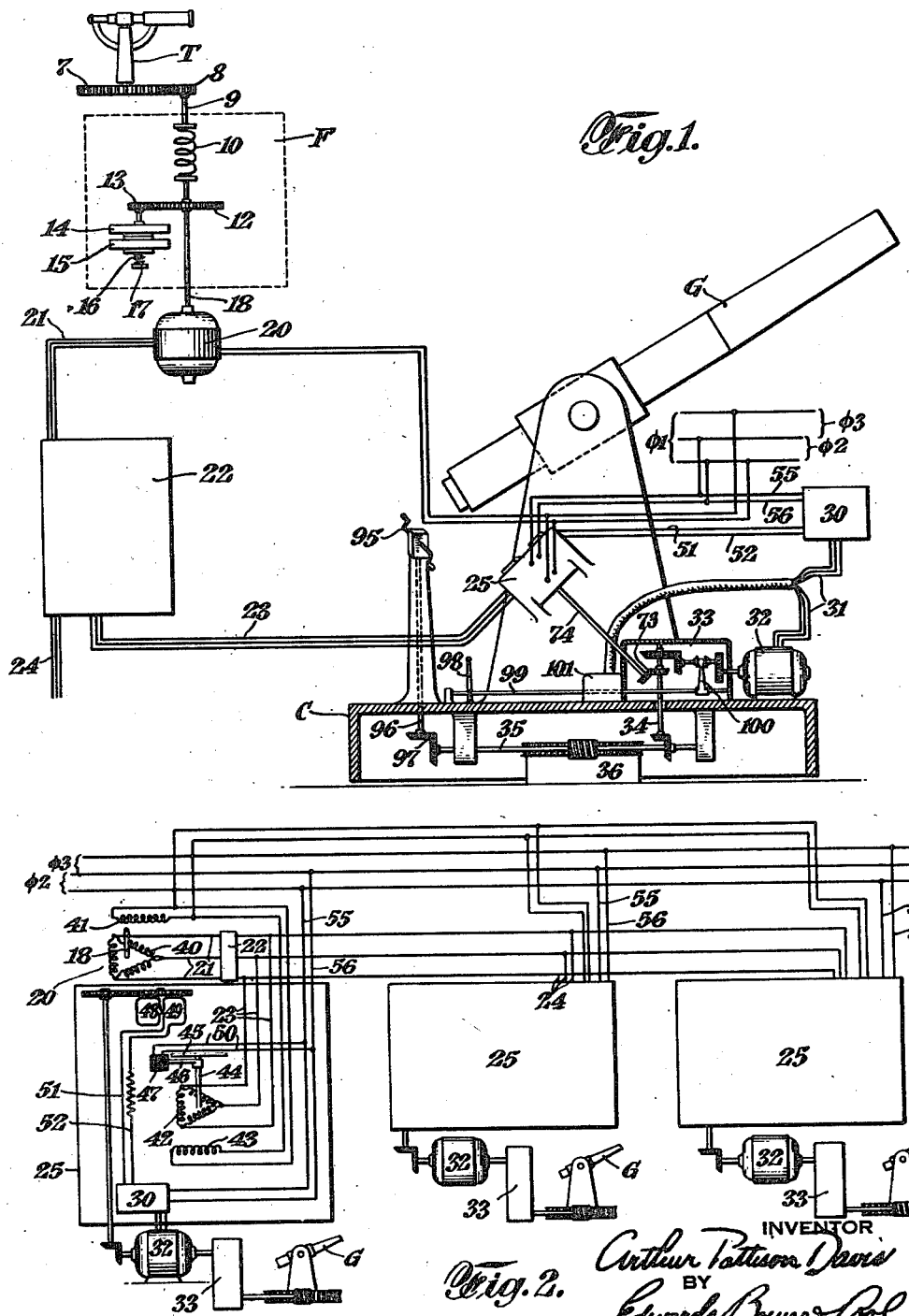

Patented May 20, 1947

2,420,816

UNITED STATES PATENT OFFICE 2,420,816

POSITION CONTROL SYSTEM

Arthur Pattison Davis, New York, N. Y., assignor to Arma Corporation, a corporation of New York Application December 10, 1932, Serial No. 646,607
Renewed March 4, 1936

2 Claims. (Cl. 318—30)

This invention relates to control systems for moving gun mounts, searchlights and the like to follow a relatively moving target.

The object of the invention is to provide a system which will be simple in the circuits and apparatus involved and accurate and dependable in service.

A further object of the invention is the provision of a system in which the weight and bulk of the apparatus are reduced to a minimum.

Many prior systems have been complicated in control and operating features not only involving intricate wiring connections and heavy, cumbersome apparatus, but also increasing the risks of failure by multiplication of the parts involved.

In the system of this invention lighter and less complex apparatus and circuits are used to attain such a relation in movement between the director element and the controlled device that the latter is readily trained on the target and unerringly maintained in close agreement with each instantaneous position thereof.

The invention is illustrated in the drawings in connection with gun training mechanism turning the gun carriage around a vertical axis but it is obvious that the elevating mechanism may be similarly controlled and that the system may be applied to other controlled devices such as searchlights, observation platforms, range finders and the like.

In the drawings illustrating the invention

Fig. 1 is a diagrammatic view showing the system in outline representing the connections between the various parts, Fig. 2 is a diagram showing electrical circuits of the system fed from a common three-phase supply, Fig. 3 is a diagram illustrating the circuit connections for controlling and supplying current to the driving motor for the gun carriage, Figs. 4 and 5 are plan and sectional views respectively of the indicator apparatus and associated parts, and Fig. 6 is a diagrammatic view of an alternative form of indicating and control apparatus.

In the specific embodiment of this invention shown in the drawings the telescope T (Fig. 1) is the director element, the gun carriage C the controlled device. The purpose is to train the telescope T on the moving target and to correspondingly move the gun carriage so that the gun G is continuously maintained in accurate relation to the target and ready to shoot at all times.

Movement of the telescope T is imparted to gear 7 and pinion 8 on shaft 9 and communicated to an electrical transmitting device 20 through a mechanical filter apparatus generally designated F. The transmitter 20 through connections 21, 23 moves the control means in the indicator housing 25 on the gun mount, and these controlling means in turn are connected to vacuum tube circuits in box 30 to operate the motor 32 and through it to drive the gun carriage so that the gun G will closely follow the movement of the telescope T.

In some instances, for example on shipboard, the director element T is likely to have superposed on its normal target following movements additional aberrations. For instance, the calculating and compensating mechanism used to control the movement of the telescope is frequently slightly irregular in its action, giving pulsations to the transmitted movement, so that instead of a smooth motion the director progresses by a series of more or less jerky approximations involving rapid reversals tending to impose undue burden and vibration on the remainder of the control. The periods of these superimposed vibrations are short compared to the shortest periods of the motion it is desired to transmit and by absorbing these oscillations of higher frequency the vibration may be reduced without introducing appreciable lag in the system if the filtering means is properly proportioned. For instance, in order to overcome and filter out these superposed pulsations and to prevent these from being transmitted to the control parts, the shaft 9 of the pinion 8 is connected to the shaft 18 of the transmitter 20 yieldingly as by the spring 10 constraining these shafts to move together but yielding slightly to permit relative rotation between them, according to variations in the torque transmitted by the shaft 9. A gear 12 fixed on shaft 18 meshes with pinion 13 driving the flywheel 14 so that the shaft 18 will have a desired amount of inertia. The flywheel comprises a portion 14 fixed on the shaft and another portion 15 rotatable thereon and frictionally gripped under pressure of the spring 16 controlled and regulated by the adjustment 17. The resiliency of the spring 10 and the weight of the flywheel parts 14 and the pressure of the spring 16 are so predetermined and adjusted that the natural period of the filter F is approximately two or more times the period of the slowest of the motions it is desired to absorb and eliminate between the director and transmitter. As a result the undesirable aberrations superimposed on the proper motion of the director do not reach the transmitter and are not communicated to the remainder of the control system. The governing motion imparted to the transmitter is thus smoothed out with increase in accuracy and avoidance of vibration in the operating means for the gun or other following device.

An alternative form of absorbing means is diagrammed in Fig. 6 applied as a modification of the motor means driving the indicator shaft at the gun mount. In this figure 43 is the stator, the rotor 42 of which (Fig. 2) is mounted on the shaft 44 carrying the indicator disk 45 and the arm 46 of the follow-up magnet 47 moving in the circle of the follow-up coils 48, 49. On this shaft 44 the disk 103 carries the annular container 104 filled with mercury and having a number of vanes or baffles 105 opposing relative movement between the mercury and the container. This loading of the rotor and the damping effect of the baffles 105 tend to resist and absorb high oscillatory torques of relatively high frequency between the stator 43 and the rotor 42 so that the rotor follows only the relatively low frequency movements of the director, the superposed vibrations of which are thus prevented from being transmitted to the operating means for the gun carriage motor.

The corrected director movement transmitted to shaft 18 turns the rotor coils 40 correspondingly and alters voltages in the three phases of the coil 40 and causes currents to flow through the connecting conductors 21, 23, and the coils of the rotor 42 in indicator housing 25. The stator coils 41 and 43 of rotors 40 and 42 respectively are energized from some suitable source of alternating current, for instance, phase one of the three-phase supply, and these parts are so arranged and proportioned that the receiving rotor 42 follows exactly the angular movements of the transmitting rotor 40 in well known manner.

The receiving rotor 42 (Fig. 2) turns a shaft 44 carrying the indicator dial 45 at the face of the indicator housing 25 and also carrying arm 46 having at its end a magnet coil 47 moving within the circle of the follow-up coils 48, 49 mounted in the housing under the dial 45. The follow-up magnet coil 47 is energized through slip rings not shown and conductors 50 from a phase, for instance φ2 of the three-phase supply (Figs. 1 and 2). In normal neutral position the coil 47 is on the center line between the follow-up coils 48, 49 so that equal and opposite voltages are developed in said coils which are connected in opposed and bucking relation and in series through conductors 51, 52 with the control coil 53 of the tube box 30 (Fig. 3). This control coil 53 is connected in any desired manner to operate the motor 32 in opposite directions to move the gun carriage correspondingly. In the circuits shown in Fig. 3 current is supplied to the motor 32 from phase φ2 through conductors 55, 56. Conductor 55 is connected to one brush of the motor commutator, the other brush of which is connected through the alternate series fields 57, 58 and conductors 59, 60 to the plates 61, 62 of vacuum tubes 63, 64 respectively. A primary winding 65 across conductors 55, 56 has one secondary 66 supplying the filament current for the tubes and another secondary 67 connected through coils 68, 69 to grids 70, 71 respectively of the tubes 63, 64. Current in one direction through control coil 53 reducing the bias on the corresponding grid 70 or 71 will cause current to flow in series through the motor armature and the corresponding series field 57 or 58 to turn the motor in one direction. Current in reverse direction in control coil 53 will operate the motor in the opposite direction and the motor operation will continue in either direction until the follow-up magnet 47 and the follow-up coils 48, 49 are returned to normal neutral relation reducing the current through coil 53 to zero.

In the specific apparatus shown in the drawings (Fig. 1) the motor 32 drives the gun carriage C through gearing in gear box 33 rotating the vertical shaft 34 geared to the horizontal shaft 35 mounted in brackets from the carriage and carrying a worm wheel engaging a worm stationary with the fixed central pedestal 36. Restoring mechanism adapted to move the follow-up coils 48, 49 to correspond with the movement of the gun carriage C is driven from gearing 73 rotating the shaft 74 (Fig. 1) carrying the pinion 75 (Fig. 5) geared to a plate 76 carrying coils 48, 49. Assuming a movement of the director T in a given direction and the follow-up movement of the arm 46 and coil 47 in the corresponding direction, then the drive of the motor 32 through the restoring connections will rotate the coils 48, 49 in the same direction to move with the magnet 47.

Due to spring, inertia and friction between the drive motor 32 and the follow-up coils 48, 49 the coils will lag somewhat behind a true position corresponding to the position of magnet 47. Such lag will tend to sustain oscillation or hunting between the coils and the magnet when the coils finally catch up, and such lagging and hunting are very objectionable in disturbing and interfering with the accuracy of the control and in setting up vibrations unduly prolonging the movement of the control parts. To overcome these objections the system of this invention provides for an automatic advance of the follow-up coils exactly proportionately offsetting the lag and maintaining the proper relative position of the magnet and the coils at all times and under all conditions. To attain this, the coils 48, 49 are mounted to be rotatable with respect to the supporting plate 76, vertical arms 79 being provided pivoted at 80 to the plate and pivotally supporting the coils at the upper ends 81 of the arms as shown. Below the plate 76 is a heavy disk member 82 rotating concentrically with the plate 76 and having bearings on the same bushing member 83 extending upward from the motor housing below. The disk 82 has openings 85 across which project the pins 86 engaging slots in the lower ends of the arms 79. The disk 82 is connected to plate 76 by opposite springs 87, 88 fastened at their adjacent ends to the pin 89 of disk 82 and at their outer ends to the pins 90, 91 on the plate 76. The fastenings at the outer ends are adjustable as shown so that the opposite pull of the springs can be relatively adjusted to accurately center the disk and plate with relation to each other and to precisely predetermine the exact position of the coils 48, 49. A drag or damping effect is exerted on the disk 92 by an adjustable spring pressed shoe 92 carried on bracket 93 of the motor frame.

In operation when the plate 76 is returned by the pinion 75 of the restoring mechanism, the acceleration of the plate in either direction will correspondingly tilt the arm 79 and rotate the coils 48, 49 slightly in advance of the plate rotation. This advancing of these follow-up coils will increase with acceleration in either direction and will decrease with decrease in acceleration. Under conditions of no acceleration the relative displacement will depend upon the drag exerted by the friction device 92 and the adjustments may be such as to just counteract the lag due to the spring and friction involved. For normal operation where the acceleration forces are small, the displacement produced is negligibly small, and therefore the effect is to closely counterbalance the factors causing hunting in a way to anticipate and avoid these objectionable oscillations.

An advantage of this anti-hunting device is that no lag is introduced under normal operating conditions where the maximum speeds are comparable to the maximum speed of the driving motor. Under these normal operating conditions, however, the maximum acceleration forces are small compared to the acceleration forces such as are brought into play when the system is switched on to bring the gun to the target. An anti-hunting device operating, for instance, as a function of the velocity tends to introduce more lag than one operating as a function of acceleration. In fact, it is theoretically possible so to proportion an anti-hunting device of the present type operating as a function of acceleration that the lag or lead is zero. This follows from the consideration of the factors that produce hunting. If there were no spring and friction between the driving motor and the control member the system would not sustain oscillations. Spring and friction cause a displacement of the follow-up coil in such a direction as to sustain an oscillation. An anti-hunting device producing displacement of the follow-up coil determined by the same factors (spring and friction), but in the opposite direction, destroys the tendency of the system to sustain an oscillation and by over-compensating the system can be brought to rest with substantially no overrunning.

The automatic system of this invention is readily installed in connection with the usual hand operation and without any interference therewith. In hand operation the operator reads the movement on the dial face 45 and follows this as closely as he can by turning the hand crank 95 connected through shaft 96 and gears 97 to the worm shaft turning the carriage. To shift from the automatic to the hand movement the cutout lever 98 is turned to turn shaft 99 and disconnect the motor drive through clutch 100, at the same time opening the control circuit through the cutout switch 101. Then the operation is entirely by hand and the operator moves the carriage so that the marking on the surface of the annular strip 102 surrounding the dial 45 will be maintained in correspondence with the marking on the dial, the restoring or following-up drive being the same as that employed in the automatic operation. In case of emergency or any disablement of the motor drive, the hand drive can be immediately substituted.

The system of this invention combines and co-operates with the usual control apparatus adding only such parts as are necessary to provide for the automatic power drive and to improve the operation of the control whether by hand or by motor. The mechanical filter F at the director is, of course, effective for either operation.

The system does not require a direct current generator and the alternating current load is readily distributable so as to present a balanced demand on the main supply. As indicated in Figs. 1 and 2 the power supply for windings 41, 43 may be drawn from a phase different from that of the power supply through conductors 55, 56 to the motor operating system. Similarly these motor drives may be drawn from different phases as shown, and the control voltages are not necessarily drawn from the same self-synchronous supply. Consequently, the main three phase supply of a ship or the like may be drawn in any balanced manner for the power supply and without requiring extra installation of motor generator sets or any tendency toward unbalancing the load. On the contrary since each motor may draw its supply from any phase the connections to the main supply may be made most advantageous to offset other unbalanced loading. The current supplies also may be drawn from independent sources and are not confined to the interrelated phases.

This system is therefore simple in its circuits and the apparatus involved avoiding complicated and cumbersome parts and utilising few parts, light in weight and easily maintained in efficient fully operative condition.

The indicating motor 42, 43 for hand operation, the control element 47, 48, 49 and the anticipator provided by the movable mounting of the control coils 48, 49 are all embodied in one unit so that expensive, cumbersome duplication is avoided and the same motor serves both for the hand and automatic operation. The hand operation and the automatic operation are thus conveniently combined for easy shift from one to the other and with a minimum addition of apparatus and control circuits.

I claim:

1. In a system for moving a controlled element according to the relative movement of an object, the combination with a director device adapted to follow the movement of said object, means for transmitting the motion of said director to indicating means adjacent said controlled element, hand operated means connected to said indicator for moving said controlled element according to the reading of said indicator, automatic means for moving said controlled element by the movement of said indicator and means for selectively shifting from said hand operated means to said automatic operated means and vice versa at will.

2. In a system for moving a plurality of controlled elements according to the relative movement of an object, the combination with a director device adapted to follow the movement of said object, indicating means positioned adjacent each of said controlled elements and adapted to move in correspondence with said director, hand operated means connected to the indicator means at each of said controlled elements for moving the corresponding element according to the reading of its indicator, automatic operated means for each of said elements adapted to automatically follow the movement of the corresponding indicator, and means at each of said elements for selectively shifting of said hand operated means to said automatic operated means and vice versa at will.

ARTHUR PATTISON DAVIS.

REFERENCES CITED

The following references are of record in the file of this patent:

UNITED STATES PATENTS

| Number | Name | Date |
|---|---|---|
| 1,798,592 | Davis | Mar. 31, 1931 |
| 2,025,122 | Poitras | Dec. 24, 1935 |
| 2,114,248 | Davis | Apr. 12, 1938 |
| 1,557,545 | Akermann | Oct. 20, 1925 |
| 1,881,011 | Wittkukns | Oct. 4, 1932 |
| 1,547,435 | Mittag | July 28, 1925 |
| 1,684,132 | Hewlett et al. | Sept. 11, 1928 |
| 1,684,138 | Nixdorff | Sept. 11, 1928 |
| 1,391,652 | Meitner | Sept. 20, 1921 |
| 1,290,718 | Crane | Jan. 7, 1919 |
| 1,123,067 | Barkhausen | Dec. 29, 1914 |
| 1,628,450 | Blanchard | May 10, 1927 |
| 1,391,653 | Meitner | Sept. 20, 1921 |

FOREIGN PATENTS

| Number | Country | Date |
|---|---|---|
| 703,178 | France | Feb. 2, 1931 |
| 516,620 | France | Dec. 8, 1920 |
| 687 | Great Britain | Jan. 9, 1913 |